US012603357B2

(12) United States Patent
Singh et al.

(10) Patent No.: US 12,603,357 B2
(45) Date of Patent: Apr. 14, 2026

(54) EPP FOAM BASED UAV BATTERY ENCLOSURE

(71) Applicant: ideaForge Technology Pvt. Ltd., Mumbai (IN)

(72) Inventors: Rahul Singh, Mumbai (IN); Ankit Mehta, Mumbai (IN); Ashish Bhat, Mumbai (IN); Vishal Khetmali, Mumbai (IN); Gulab Mali, Mumbai (IN)

(73) Assignee: ideaForge Technology Pvt. Ltd., Mumbai (IN)

( * ) Notice: Subject to any disclaimer, the term of this patent is extended or adjusted under 35 U.S.C. 154(b) by 952 days.

(21) Appl. No.: 17/858,653

(22) Filed: Jul. 6, 2022

(65) Prior Publication Data

US 2023/0011789 A1    Jan. 12, 2023

(51) Int. Cl.
| | |
|---|---|
| *H01M 10/658* | (2014.01) |
| *B60L 50/64* | (2019.01) |
| *B60L 58/27* | (2019.01) |
| *H01M 10/625* | (2014.01) |
| *H01M 10/6571* | (2014.01) |
| *H01M 50/227* | (2021.01) |

(52) U.S. Cl.
CPC ........... *H01M 10/658* (2015.04); *B60L 50/64* (2019.02); *B60L 58/27* (2019.02); *H01M 10/625* (2015.04); *H01M 10/6571* (2015.04); *H01M 50/227* (2021.01); *H01M 2220/20* (2013.01)

(58) Field of Classification Search
CPC ............. H01M 10/658; H01M 10/625; H01M 10/6571; H01M 50/227; H01M 2220/20; B60L 58/27; B60L 50/64

USPC .......................................................... 219/202
See application file for complete search history.

(56) References Cited

U.S. PATENT DOCUMENTS

2021/0104787 A1* 4/2021 Anderson ................. H02J 7/35

FOREIGN PATENT DOCUMENTS

KR 20180117957 A * 10/2018 .......... H01M 10/657

OTHER PUBLICATIONS

Machine Translation of KR20180117957A (Year: 2025).*

* cited by examiner

*Primary Examiner* — Edward F Landrum
*Assistant Examiner* — Thomas J Ward
(74) *Attorney, Agent, or Firm* — Workman Nydegger

(57) ABSTRACT

A thermal management device 100 for a battery pack 104 of an UAV comprises an insulating enclosure 102 that is made of a material comprising at least an EPP foam for enclosing the battery pack 104, and one or more heating coils 110. The heating coils 110 are electrically powered from an external power source 112 for pre-heating the insulating enclosure 102 to a predefined temperature before flight of the UAV. The EPP foam of the insulating enclosure 102 provides high thermal insulation for retaining the heat of the insulating enclosure 102 for heating the battery pack 104 and maintaining the temperature of the battery pack 104 above a threshold temperature when the UAV flies in a sub-zero ambient temperature. A case of the enclosure incorporates structural carbon tubes that engage with holes in a cap of the enclosure to strengthen the insulating enclosure.

16 Claims, 2 Drawing Sheets

EPP FOAM BASED UAV BATTERY ENCLOSURE

TECHNICAL FIELD

The present disclosure relates to the technical field of battery of an unmanned aerial vehicle (UAV). More specifically, it pertains to an efficient enclosure for a battery/battery pack of a UAV for retaining heat of the enclosure to keep the battery warm for a desired time period.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Unmanned vehicles such as unmanned aerial vehicles (UAVs) are generally used for performing surveillance, reconnaissance, and exploration tasks for military and civilian applications. UAVs are equipped with batteries as a power source to power devices of the UAVs. However, battery performance of the UAV gets reduced whenever UAV flies in sub-zero ambience temperature.

A typical technique to improve performance of the UAV battery in the sub-zero ambience temperature includes a typical insulating enclosure for enclosing the battery and heating circuits which are used to heat the battery to maintain the temperature of the battery. However, heating of the battery is usually done during flight of the UAVs as if the battery is pre-heated before flight, the typical insulating enclosure around the battery is not good enough to retain the temperature of the enclosure to maintain desired temperature of the enclosure to maintain desired temperature of the battery till the UAV flight ends. Heating of the battery during flight complicates the flight control system and also reduces the UAVs endurance as the electric power from the main power source of the UAVs is used for heating the battery.

There is, therefore, a need in the art to provide a simple, efficient, heat retaining and cost-effective enclosure for a battery of a UAV which can obviate such aforementioned problems in the art, and to maintain desired temperature level of the battery till the UAV flight ends without using power from the main power source of the UAV draining its endurance.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present disclosure is to provide an improved enclosure for enclosing a battery pack of UAVs.

An object of the present disclosure is to provide an UAV battery enclosure which has property of retaining heat of the enclosure for heating the battery.

Another object of the present disclosure is to provide a simple and cost-effective enclosure for enclosing UAV batteries to keep the batteries warm for a desired time period when the AV flies in sub-zero ambience temperature after preheating the enclosure before flight of the UAV.

Another object of the present disclosure is to provide a thermal management device for maintaining temperature of a UAV battery without assistance of any power source while flight when the UAV flies in sub-zero ambience temperature.

Another object of the present disclosure is to provide an improved enclosure for a battery pack of an UAV, which has impact absorption property to provide protection to the UAV battery pack during head on collision, thereby eliminating need of a separate shock absorption layer in between the battery pack and the enclosure.

These and other objects of the present invention will become readily apparent from the following detailed description taken in conjunction with the accompanying drawings.

SUMMARY

The present disclosure relates to the technical field of an unmanned aerial vehicle (UAV). More specifically, it pertains to an efficient enclosure for enclosing a battery/battery pack for retaining heat of the enclosure to keep the battery pack warm.

In an aspect, the present disclosure provides a thermal management device for a battery pack. The thermal management device includes an insulating enclosure for enclosing the battery pack. The insulating enclosure is made of a material including at least an expanded polypropylene (EPP) foam. The insulating enclosure is adapted for retaining heat of the insulating enclosure for heating the battery pack in a sub-zero ambience temperature.

In an embodiment, the thermal management device can include one or more heating coils configured between the battery pack and the insulating enclosure. The one or more heating coils is electrically powered from a power source for heating the insulating enclosure to a predefined temperature. The insulating enclosure and the one or more heating coils can be configured to provide uniform heat distribution across the battery pack.

In an embodiment, the one or more heating coils can be electrically powered to pre-heat the insulating enclosure to the predefined temperature to heat the battery pack.

In an embodiment, the one or more heating coils can include a thermostat to cut-off the power supply to the one or more heating coils from the power source when the insulating enclosure is heated to the predefined temperature.

In an embodiment, the one or more heating coils can be configured with inner surfaces of walls of the insulating enclosure. In alternate embodiment, the one or more heating coils can be configured with an outer surface of the battery pack.

In an embodiment, the insulating enclosure can include a case that is open at one side for accommodating the battery pack, and a cap to sit on the open side of the case for closing the case and for covering the battery entirely.

In an embodiment, the case of the insulating enclosure is provided with a plurality of structural carbon tubes (hereinafter also referred to as carbon fibre tubes, and both terms are used alternatively) at the open side extending outwards, and the cap is provided with a plurality of holes at the corresponding positions to take in the plurality of structural carbon fibre tubes when the cap is sited on the open side of the case. The pluralities of structural carbon tubes are provided to strengthen the insulating enclosure.

In an embodiment, a density of the EPP foam of the insulating enclosure can be in a range of 25-30 grams per litre.

In an exemplary implementation, the insulating enclosure can be implemented in an UAV. The battery pack can be a battery pack of the UAV.

In an embodiment, the EPP foam can include one or more blends and/or different derivatives of the EPP.

In another embodiment, the material of the insulating enclosure can include a combination of the EPP foam and one or more plastics in different ratios to strengthen the insulating enclosure. The one or more plastics can be selected from a group comprising a polystyrene, polyethylene, polypropylene, high-density polyethylene, polyvinyl chloride etc.

In another embodiment, the ratio of EPP foam can be more when compared to other plastics.

In another aspect, the present disclosure provides an UAV comprising a thermal management device. The thermal management device can include an insulating enclosure for enclosing a battery pack of the UAV. The insulating enclosure is made of a material including at least an EPP foam. The insulating enclosure is adapted for retaining heat of the insulating enclosure for heating the battery pack when the UAV flies in a sub-zero ambience temperature.

In an embodiment, the UAV can include one or more heating coils configured between the battery pack and the insulating enclosure. The one or more heating coils can be electrically powered from an external power source for pre-heating the insulating enclosure to a predefined temperature before flight of the UAV to heat the battery pack. The one or more heating coils can include a thermostat to cut-off the power supply to the one or more heating coils from the external power source when the insulating enclosure is heated to the predefined temperature.

In an embodiment, the EPP foam of the insulating enclosure can provide high thermal insulation for retaining the heat of the enclosure after pre-heating. The EPP foam of the insulating enclosure also has the quality of being lightweight, strong and impact resistive.

In an embodiment, impact absorption property of EPP foam of the insulating enclosure may provide protection to the UAV battery pack during collision, thereby eliminating need of a separate shock absorption layer in between the battery pack and the enclosure.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1A:
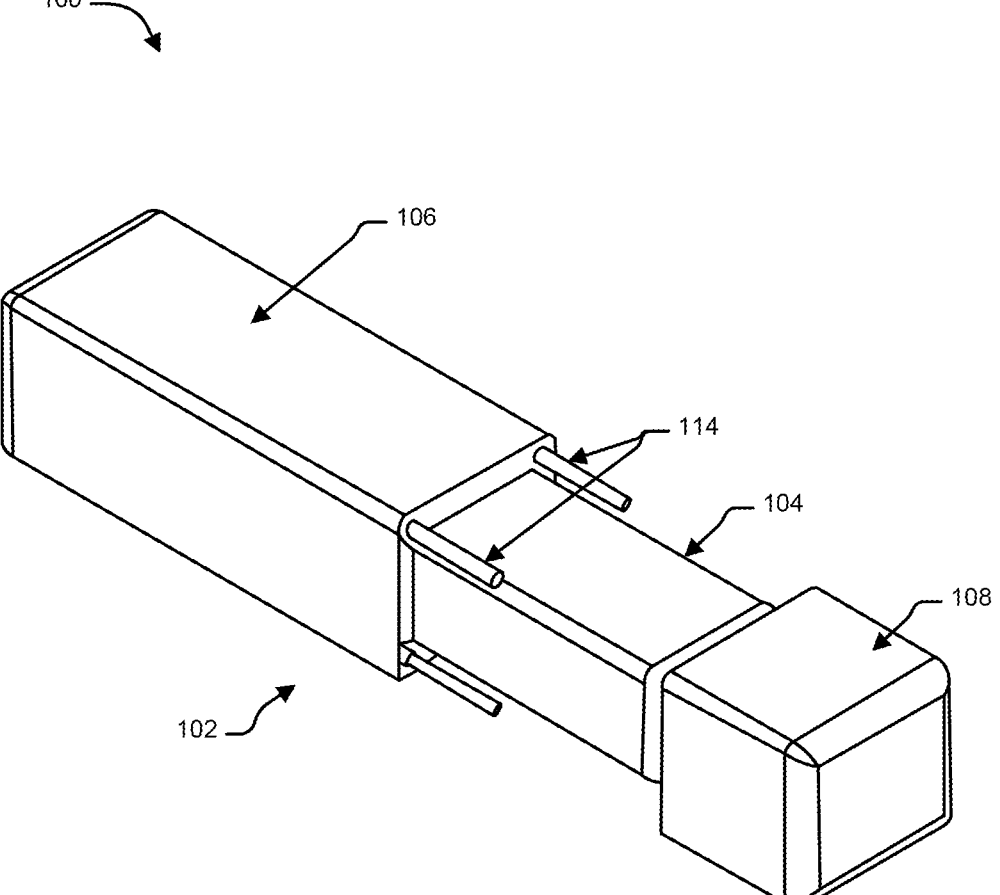
FIGS. 1A and 1B illustrate exemplary representations of an isometric view and a sectional view of the thermal management device, respectively, in accordance with embodiments of the present disclosure.

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein are shown below. To the extent a term used in a claim is not defined below, it should be given the broadest definition persons in the pertinent art have given that term as reflected in printed publications and issued patents at the time of filing.

Embodiments explained herein relate to a thermal management device for a battery/battery pack of a UAV to keep the battery pack warm for a desired time period when the UAV flies in sub-zero ambience temperature.

In an aspect, the disclosed thermal management device/ enclosure is based on an EPP foam enclosure or an insulating enclosure for enclosing the battery pack, and one or more heating coils configured with any or both of the battery pack and walls of the EPP foam enclosure. The one or more heating coils are electrically powered from an external power source for pre-heating the EPP foam enclosure to a predefined temperature before flight of the UAV to heat the battery pack. The EPP foam enclosure/insulating enclosure is adapted for retaining heat of the EPP foam enclosure for heating the battery pack when the UAV flies in a sub-zero ambience temperature.

It is to be appreciated that while various embodiments have been explained herein with reference to thermal management device for maintaining temperature of a battery pack of an unmanned aerial vehicle (UAV), the concept of the present disclosure can be applied for maintaining temperature of a battery pack of any vehicle, and all such applications are well within the scope of the present disclosure without any limitations whatsoever.

In an embodiment, the one or more heating coils may include a thermostat to cut-off the power supply to the one or more heating coils from the external power source when the EPP foam enclosure/insulating enclosure is heated to the predefined temperature.

In an embodiment, the EPP foam enclosure/insulating enclosure includes a case that is open at one side for accommodating the battery pack, and a cap to sit on the open side of the case for closing the case and for covering the battery entirely.

In an embodiment, the case of the EPP foam enclosure is provided with a plurality of structural carbon tubes at the open side extending outwards, and the cap is provided with a plurality of holes at the corresponding positions to take in the plurality of structural carbon tubes when the cap is sited on the open side of the case.

In an embodiment, the material of the insulating enclosure can include different blends of the EPP foam or derivatives of the EPP foam.

In another embodiment, the material of the insulating enclosure can include a combination of the EPP foam and one or more plastics in different ratios to provide enhanced strength. The one or more plastics can be selected from a group comprising a polystyrene, polyethylene, polypropylene, high-density polyethylene, polyvinyl chloride etc.

In another embodiment, the ratio of EPP can be more when compared to other plastics.

In an embodiment, a density of the EPP foam of the insulating enclosure is in a range of 25-30 grams per litre.

Figure 1B:
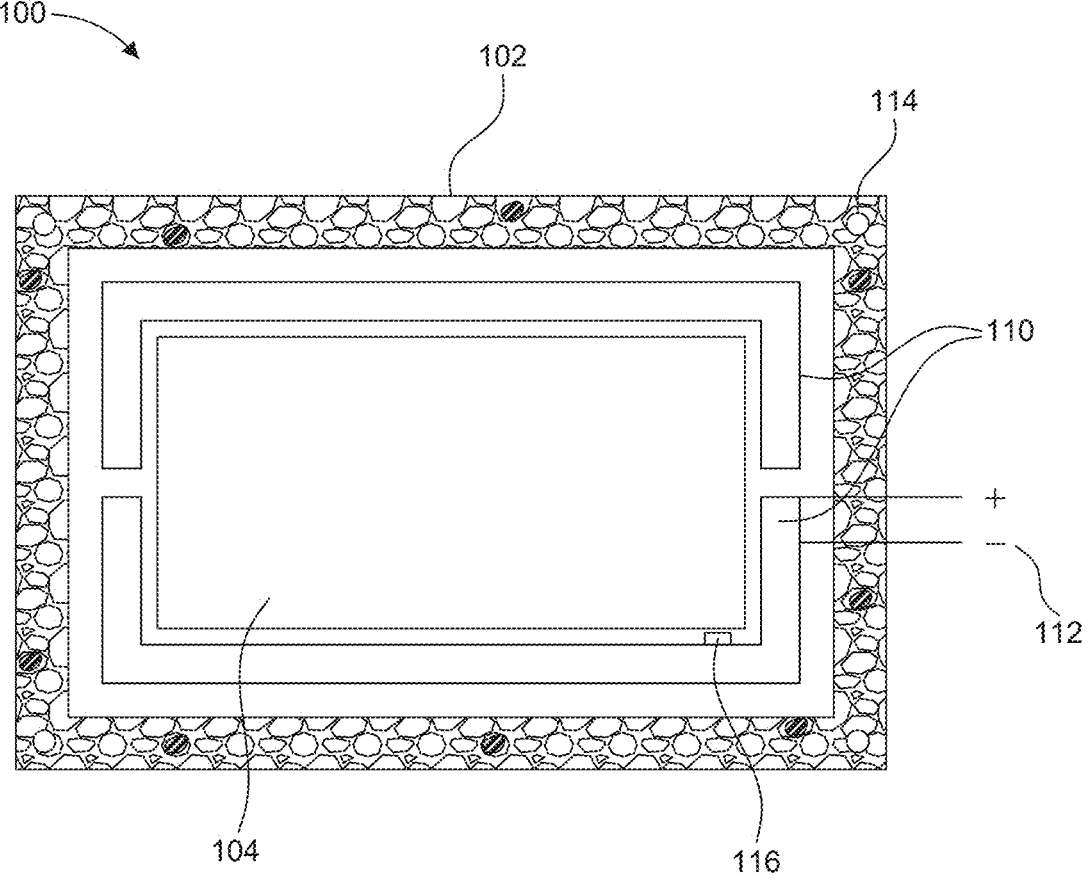

FIGS. 1A and 1B illustrate exemplary representations of an isometric view and a sectional view of the thermal management device, respectively, in accordance with embodiments of the present disclosure. As shown, the disclosed thermal management device (also referred to as enclosure hereinafter) 100 can include an insulating enclosure (also referred to as battery insulating enclosure or EPP foam enclosure hereinafter) 102 made of a material including at least EPP foam for enclosing a battery/battery pack 104 of a UAV. The insulating enclosure 102 includes a EPP case 106 that is open at one side for accommodating the battery pack 104, and a EPP cap 108 to sit on the open side of the case 106 for closing the case 106 as well as for covering a portion of the battery pack 104 projecting out of the case 106, as shown in FIG. 1A.

In an embodiment, the material of the insulating enclosure 102 can include different blends of the EPP foam.

In another embodiment, the material of the insulating enclosure 102 can include a combination of the EPP foam and one or more plastics in different ratio to improve strength of the insulating enclosure 102. The one or more plastics can be selected from a group comprising a polystyrene, polyethylene, polypropylene, high-density polyethylene, polyvinyl chloride etc.

In an embodiment, the disclosed thermal management device 100 includes one or more heating coils such as heating coils 110, as shown in FIG. 1B. The heating coil 110 can be configured between the battery pack 104 and the insulating enclosure 102. In an embodiment, the heating coils 110 can be configured with inner surfaces of walls of the insulating enclosure 102. In alternate embodiment, the heating coils 110 can be configured with an outer surface of the battery pack 104. The heating coils 110 can be electrically powered from an external power source 112 for pre-heating the enclosure 102 to a predefined temperature before flight of the UAV to heat the battery 104.

In an embodiment, the EPP foam enclosure/insulating enclosure 102 can be adapted for retaining heat of the enclosure 102 for heating the battery pack 104 when the UAV flies in a sub-zero ambience temperature. After pre-heating the insulating enclosure 102 before flight of the UAV, the insulating enclosure 102 can maintain temperature of the battery pack 104 to a threshold temperature level for a predefined period of time when the UAV flies in the sub-zero ambience temperature. Thus, initially before the UAV takes flight, the EPP foam battery enclosure 102 is pre-heated with the help of the heating coils 110 and the external power source 112 such as a battery, and this heat is retained in the EPP foam battery enclosure 102 for heating the battery pack 104. Further, once the UAV takes flight the battery pack 104 starts warming up with the additional heat unrolling from the UAV collectively and this warming up or heat of the battery pack 104 is retained till the UAV is in flight. The insulating enclosure 102 reduces heat loss from the inner side to the outside of the insulating enclosure 102 time when the UAV flies in the sub-zero ambience temperature.

In another embodiment, the heating coils 110 can be embedded within the EPP foam enclosure 102. The EPP foam enclosure 102 can be heated, using the heating coils 110, in intervals or at any time during the UAV flight when the temperature of the battery pack 104 falls below a certain threshold value.

In an embodiment, the EPP foam of the insulating enclosure 102 provides high thermal insulation for retaining the heat of the insulating enclosure 102 after pre-heating. The insulating enclosure 102 with the heating coils 110 facilitate uniform heat distribution across the battery pack 104, as heat is not lost significantly in the air. The EPP foam of the insulating enclosure 102 minimises heat loss to the atmosphere. For instance, about 0.10 to 0.20 degrees of temperature drop of the battery pack 104 occurs over a period of 100 second when the battery pack 104 kept inside the insulating foam enclosure 102. Whereas, when the battery pack 104 is exposed to the air/atmosphere without the insulating foam enclosure 102, about 4 degrees of temperature drop of the battery pack 104 occurs over a period of 100 seconds.

In an embodiment, a density of the EPP foam of the insulating enclosure 102 can be in a range of 25-30 grams per litre (GPL).

In an embodiment, the heating coils 110 can include a thermostat 116 to cut-off the power supply to the heating coils from the external power source 112 when the EPP foam enclosure 102 is heated to the predefined temperature.

In an embodiment, the case 106 of the enclosure 102 can be provided with a plurality of structural carbon fibre tubes such as tubes 114 at the open side extending outwards, and the cap 108 can be provided with a plurality of holes at the corresponding positions to take in the plurality of structural carbon fibre tubes 114 when the cap 108 is sited on the open side of the case 106.

In an embodiment, the structural carbon tubes 114 can be provided to strengthen the enclosure 102.

In an embodiment, the EPP foam of the insulating enclosure 102 also has the quality of being lightweight, strong and impact resistive. Impact absorption property of EPP foam of the insulating enclosure 102 may provide protection to the UAV battery pack 104 during head on collision and there is no need of a separate shock absorption layer in between the battery pack 104 and the enclosure 102.

In an embodiment, the insulating enclosure 102 can be designed such that it is an air-tight enclosure.

Thus, the present disclosure discloses a thermal management device including EPP foam enclosure for enclosing a battery pack of a UAV to keep the battery pack warm for a desired time period when the UAV flies in sub-zero ambience temperature after preheating the EPP foam enclosure before flight of the UAV.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides an improved enclosure for enclosing a battery of UAVs.

The present disclosure provides an UAV battery enclosure which has property of retaining heat of the enclosure for heating the battery.

The present disclosure provides a simple and cost-effective enclosure for enclosing UAV batteries to keep the batteries warm for a desired time period when the AV flies in in sub-zero ambience temperature after preheating the enclosure before flight of the UAV.

The present disclosure provides a thermal management device for maintaining temperature of a UAV battery without assistance of any power source while flight when the UAV flies in sub-zero ambience temperature.

The present disclosure provides an improved enclosure for a battery pack of an UAV, which has impact absorption property to provide protection to the UAV battery pack during head on collision, thereby eliminating need of a separate shock absorption layer in between the battery pack and the enclosure.

We claim:

1. A thermal management device for a battery pack, the thermal management device comprising:

an insulating enclosure for enclosing the battery pack, wherein the insulating enclosure is made of a material comprising at least an expanded polypropylene (EPP) foam; and wherein the insulating enclosure is adapted for retaining heat of the insulating enclosure for heating the battery pack in a sub-zero ambience temperature;

wherein the insulating enclosure comprises a case that is open at one side for accommodating the battery pack, and a cap to sit on the open side of the case for closing the case and for covering the battery entirely; and wherein the case of the insulating enclosure incorporates a plurality of structural carbon tubes at the open side extending outwards, and the cap incorporates a plurality of holes at the corresponding positions to take in the plurality of structural carbon tubes when the cap is fitted on the open side of the case.

2. The thermal management device as claimed in claim 1, wherein the thermal management device comprises one or more heating coils configured between the battery pack and the insulating enclosure, the one or more heating coils being electrically powered from a power source for heating the insulating enclosure to a predefined temperature.

3. The thermal management device as claimed in claim 2, wherein the one or more heating coils comprise a thermostat to cut-off the power supply to the one or more heating coils from the power source when the insulating enclosure is heated to the predefined temperature.

4. The thermal management device as claimed in claim 2, wherein the insulating enclosure and the one or more heating coils are configured to provide uniform heat distribution across the battery pack.

5. The thermal management device as claimed in claim 1, wherein the plurality of structural carbon tubes are configured to strengthen the insulating enclosure.

6. The thermal management device as claimed in claim 1, wherein a density of the EPP foam of the insulating enclosure is in a range of 25-30 grams per liter.

7. The thermal management device as claimed in claim 1, wherein the EPP foam comprises one or more blends.

8. The thermal management device as claimed in claim 1, wherein the material of the insulating enclosure comprises one or more plastics.

9. An unmanned aerial vehicle, comprising:

a thermal management device for a battery pack of the unmanned aerial vehicle, the thermal management device comprising:

an insulating enclosure for enclosing the battery pack of the unmanned aerial vehicle, wherein the insulating enclosure is made of a material comprising at least an EPP foam; and wherein the insulating enclosure is adapted for retaining heat of the insulating enclosure for heating the battery pack when the unmanned aerial vehicle flies in a sub-zero ambience temperature;

wherein the insulating enclosure comprises a case that is open at one side for accommodating the battery pack, and a cap to sit on the open side of the case for closing the case and for covering the battery entirely; and wherein the case of the insulating enclosure incorporates a plurality of structural carbon tubes at the open side extending outwards, and the cap incorporates a plurality of holes at the corresponding positions to take in the plurality of structural carbon tubes when the cap is fitted on the open side of the case.

10. The unmanned aerial vehicle as claimed in claim 9, wherein the unmanned aerial vehicle comprises one or more heating coils configured between the battery pack and the insulating enclosure, the one or more heating coils being electrically powered from an external power source for pre-heating the insulating enclosure to a predefined temperature before flight of the UAV to heat the battery pack.

11. The unmanned aerial vehicle as claimed in claim 10, wherein the one or more heating coils comprise a thermostat to cut-off the power supply to the one or more heating coils from the external power source when the insulating enclosure is heated to the predefined temperature.

12. The unmanned aerial vehicle as claimed in claim 10, wherein the insulating enclosure and the one or more heating coils are configured to provide uniform heat distribution across the battery pack.

13. The unmanned aerial vehicle as claimed in claim 9, wherein the plurality of structural carbon tubes are configured to strengthen the insulating enclosure.

14. The unmanned aerial vehicle as claimed in claim 9, wherein a density of the EPP foam of the insulating enclosure is in a range of 25-30 grams per liter.

15. The unmanned aerial vehicle as claimed in claim 9, wherein the EPP foam comprises one or more blends.

16. The unmanned aerial vehicle as claimed in claim 9, wherein the material of the insulating enclosure comprises one or more plastics.

\* \* \* \* \*